April 22, 1952  J. W. CLARK  2,593,847
TOOLHOLDER
Filed Nov. 26, 1947
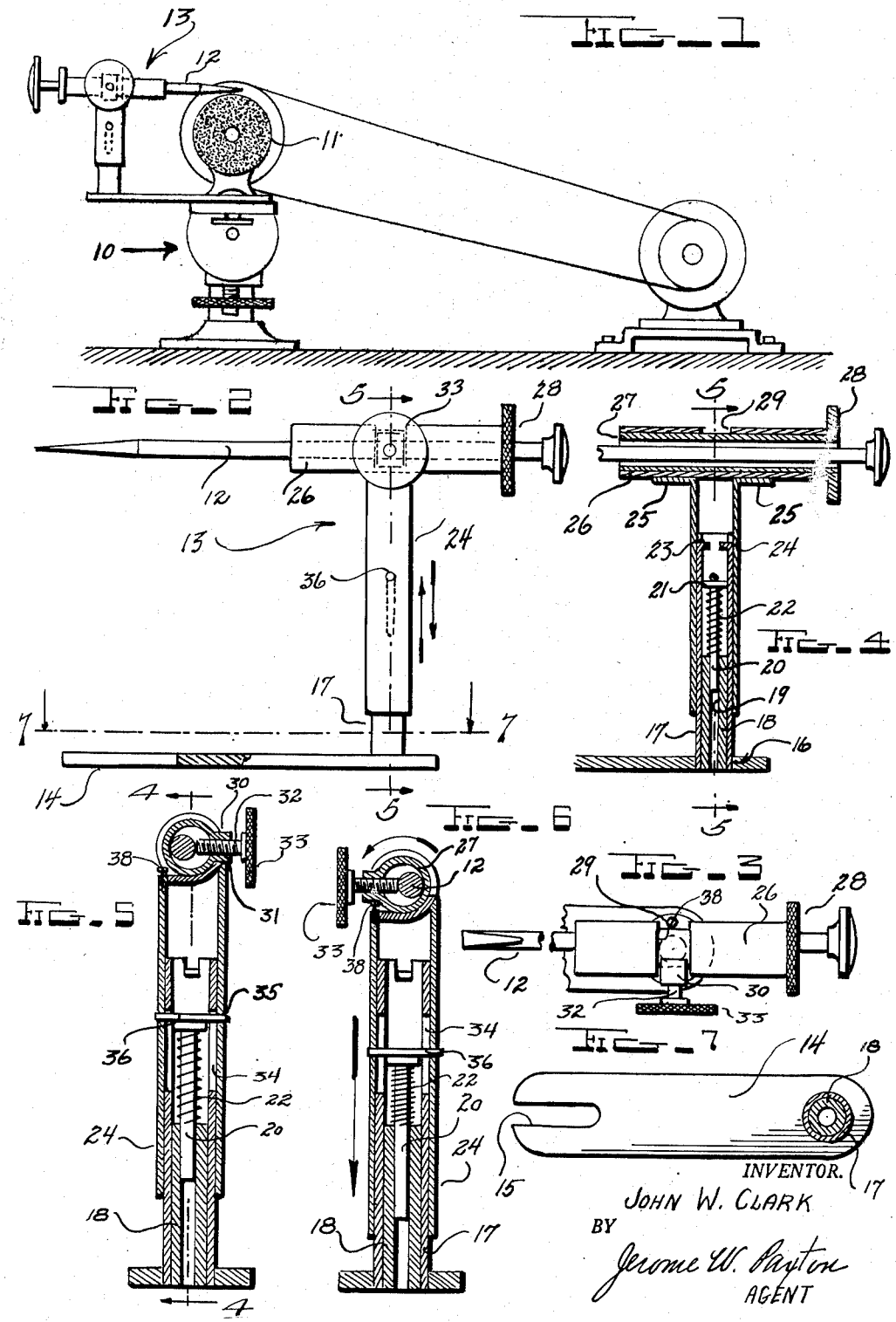
INVENTOR.
JOHN W. CLARK
BY
Jerome W. Payton
AGENT Patented Apr. 22, 1952

2,593,847

UNITED STATES PATENT OFFICE 2,593,847

TOOLHOLDER

John Wesley Clark, Buffalo, Mo.

Application November 26, 1947, Serial No. 788,237

5 Claims. (Cl. 51—218)

In general, the present invention relates to tool holders and, in its more specific application, it has reference to a novel holding device for holding watchmakers tools, such as screw drivers, during the sharpening process of the screw driver. It is to be understood, however, that my inventive concept is not thus limited, as it may be employed with equally efficient results for sharpening or otherwise working upon various types of tools.

One object of my invention is to provide a tool holder for holding a tool in a predetermined position with respect to a grinding surface which may be readily secured to or detached from the support for the grinding tool.

Another object of my invention is to provide a tool holder for watchmakers' screw drivers or the like, which is so designed that each side of the screw driver may be presented to the grinding tool by a simple adjustment of the holder.

And yet a further object of my invention is to provide a tool holder of the character described which is simple in construction and operation, and which includes few, essential working parts.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is a view in side elevation, showing the manner in which my tool holder is mounted on a watchmaker's lathe provided with a grinding wheel for sharpening the sides of a screw driver.

Figure 2 is an enlarged view in side elevation of the tool holder and its bracket for detachably connecting the tool holder to a supporting surface.

Figure 3 is a top plan view of the holder shown in Figure 2, with the bracket and screw driver partly broken away.

Figure 4 is a sectional view taken along the line 4—4 of Figure 5.

Figure 5 is a sectional view taken along the line 5—5 of Figure 4.

Figure 6 is a view similar to Figure 5, showing the outer telescoping member partially depressed on the inner member.

Figure 7 is a view taken along the line 7—7 of Figure 2.

Referring to Figure 1, I have shown a watchmaker's lathe 10 having a grinding wheel 11 affixed thereto, and a watchmaker's screw driver designated 12 is mounted in my novel holding device indicated generally 13, which is suitably supported on the lathe frame 10.

The tool holder 13 comprises a supporting bracket 14 which is slotted at one end as shown at 15 to enable the bracket to be suitably secured to any supporting surface. Secured within aperture 16 in the bracket 14 is a vertical tube-like member 17. A plug 18 having a central bore 19 is disposed in the lower part of the tube 17, and a rod 20 having a head 21 at its upper end is mounted for vertical sliding movement in the bore 19 and is normally forced upwardly by a helical spring 22. The upper end of the tube 17 is formed with a pair of oppositely disposed inturned ears 23 which will prevent the head 21 being forced out of the open end of the tube 17.

Telescoping on the tube 17 is a second tube-like member 24, the diameter of which is slightly greater than that of tube 17 so that the tube 24 may have easy sliding movement on the tube 17. The upper end of the tube 24 is formed with oppositely disposed horizontal portions 25 to which is suitably secured a horizontally disposed tube 26. Mounted within the tube 26 is a tubular member 27 provided with a knurled operating head 28 at the rear end thereof. The tube-like member 27 may be rotated by proper manipulation of the head 28. Intermediate the length of the tube 26, it will be observed that the tube is provided with an arcuate slot 29. That portion of the tube 27 which is disposed in the slot 29 is formed with a boss 30 having a threaded bore 31. A screw 32 is adapted to thread into the threaded bore 31 and carries an operating head 33 at its outer end.

When it is desired to sharpen the tool 12, the screw 32 is rotated so that it will be withdrawn from the interior of the tube-like member 27, and the tool is inserted through this member. After the tool 12 has been properly located in the member 27, the screw is manipulated to hold it against the tube-like member 27, as shown in Figure 5.

The tube 17 is formed with a pair of opposed slots 34 and the tube 24 is formed with opposed apertures 35. A pin 36 extends through the apertures 35 and slots 34 immediately above the head 21 on the rod 20. Manifestly, the spring 22 will urge the rod 20 upwardly to maintain the outer tube 24 in the position shown in Figure 5.

When it is desired to use the device and the tool 12 is suitably locked in the tube-like member 27, the operator applies a slight pressure to the tube 26, thereby forcing tube 27 downwardly on the tube 17 against the action of the spring 22 to bring the edge of the tool 12 into contact with the grinding wheel 11. After one side of the screw driver has been properly sharpened, the operator may give the head 33 a slight flip to rotate it from the position shown in Figure 5 to that shown in Figure 6, in order that the opposite side of the screw driver may be worked upon. After the sharpening process is completed, the pressure on the tube 26 is released and the spring will move the tube 27 upwardly, thus raising the tool 12 away from the grinding wheel 11.

Another important feature in the present invention is the provision of a levelling screw 38 which is mounted in the upper edge of the tube 24 intermediate the slot 29. The purpose of the screw 38 is to effect an adjustment whereby the bit of the screw driver is maintained flat against the grinding wheel. Often one corner of the screw driver bit will be of greater thickness than the other corner. Hence, by proper manipulation of the screw in its threaded aperture, the bit will be moved to a level position relative to the grinding wheel and, as a consequence, after the grinding operation, the bit will have a uniform thickness.

I claim:

1. In a device for holding a watchmaker's tool against a sharpening surface, a vertical hollow post, a tube slidably mounted on the post, a hollow support on the free end of the tube disposed at right angles to the tube, a tool holder mounted within the hollow support for rotational movement therein, said hollow support having a slot intermediate the ends thereof, a boss on the tool holder extending through the slot, a screw threaded into the boss for securing the tool in the holder, said boss and slot permitting the holder to rotate 180 degrees to present different faces of the tool to the sharpening surface, and spring means within said hollow post and cooperating with said tube to urge the tube and tool holder away from the sharpening surface.

2. In a device for sharpening a tool, a sharpening surface, a support member mounted in operative relation to the sharpening surface, a vertical post on said support member, a tube telescopically mounted on said post, a hollow support on the free end of the tube disposed at right angles to the tube, a tool holder mounted within said hollow support for rotational movement therein, said hollow support having a slot intermediate the ends thereof, a projection on the tool holder extending through the slot, means on the tool holder to secure the tool in said holder, the said projection and slot permitting the holder to rotate 180 degrees to present different faces of the tool to the sharpening surface, and spring means cooperating with said tube to urge the tube and tool holder away from the sharpening surface.

3. A device as claimed in claim 2 wherein said tool holder is provided with a knurled head for rotating the holder.

4. A device as claimed in claim 1 wherein the tool holder is provided with a knurled operating head to rotate said tool holder.

5. In a device for sharpening a tool, a sharpening surface, a support member mounted in operative relation to the sharpening surface, a vertical post on said support member, a tube telescopically mounted on said post, a hollow support on the free end of the tube disposed at right angles to the tube, a tool holder mounted within said hollow support for rotational movement therein, means on said tool holder for securing the tool therein, couplemental means on the follow support and the tool holder to permit the holder to rotate 180 degrees to present different faces of the tool to the sharpening surface, and spring means cooperating with said tube to urge the tube and tool holder away from the sharpening surface.

JOHN WESLEY CLARK.

REFERENCES CITED

The following references are of record in the file of this patent:

UNITED STATES PATENTS

| Number | Name | Date |
| --- | --- | --- |
| 535,021 | Rivett | Mar. 5, 1895 |
| 688,384 | Brooks | Dec. 10, 1901 |
| 993,734 | Thielemann | May 30, 1911 |
| 1,377,884 | Heryngfel et al. | May 10, 1921 |
| 1,481,260 | Hemmenway | Jan. 22, 1924 |
| 2,110,441 | Kasch | Mar. 8, 1938 |
| 2,124,093 | Wells | July 19, 1938 |
| 2,151,528 | Preston | Mar. 21, 1939 |
| 2,346,300 | Guy | Apr. 11, 1944 |
| 2,347,087 | Dayarmond | Apr. 18, 1944 |
| 2,368,077 | McCarthy | Jan. 23, 1945 |
| 2,432,058 | Wiken et al. | Dec. 2, 1947 |